Jan. 24, 1950     W. F. AMON, JR., ET AL     2,495,499
LIGHT FILTER TRANSMITTING INFRARED RADIATION AND
OPAQUE TO VISIBLE LIGHT
Filed March 5, 1946

UNITED STATES PATENT OFFICE 2,495,499

LIGHT FILTER TRANSMITTING INFRARED RADIATION AND OPAQUE TO VISIBLE LIGHT

William F. Amon, Jr., Boston, and Elkan R. Blout, Cambridge, Mass., assignors to Polaroid Corporation, Cambridge, Mass., a corporation of Delaware Application March 5, 1946, Serial No. 652,160

3 Claims. (Cl. 88—109)

This invention relates to apparatus designed for selective transmission of infrared radiations in spectral regions invisible to the human eye, and to selectively light-absorbing material for use with such apparatus.

The particular object of the invention is to provide such apparatus embodying a source of heat and light radiations and having light-filtering material which has a complete absorption for all light of a wave length shorter than 1 micron, while having high transmission for radiations of wave length above 1 micron.

Another object of the invention is to provide a suitable filtering material of the above character by the use of the product resulting from the heating, in the presence of an acid catalyst, of hydroxylated polymers or the derivatives thereof.

Another object of the present invention is to provide a suitable filtering material of the above character by the use of the dehydration products of certain linear high polymers and in particular, those containing substituent groups in the $\beta$-position to each other, said groups being hydroxyl groups or being capable of being converted to hydroxyl groups or derivatives thereof.

Another object of the invention is to utilize as such a filtering material the dehydration products of substituted polyvinyl alcohols.

A further object of the invention is to use as a filtering material of the above character, a dehydration product of polyvinyl alcohol.

A still further object of the present invention is to use as a filtering material of the above character a dehydration product of a substituted polyvinyl alcohol such as polyvinyl butyral, polyvinyl acetal, or polyvinyl acetate.

Figure 1:
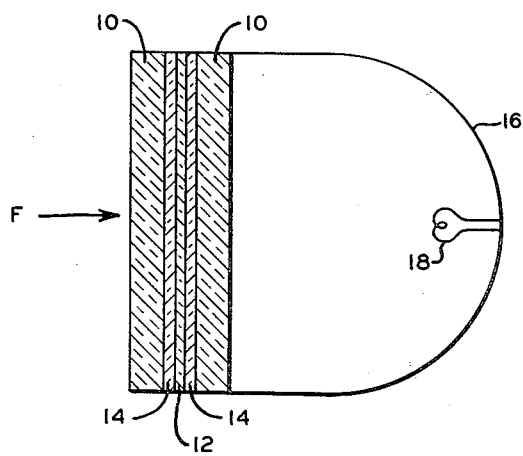
Figure 2:
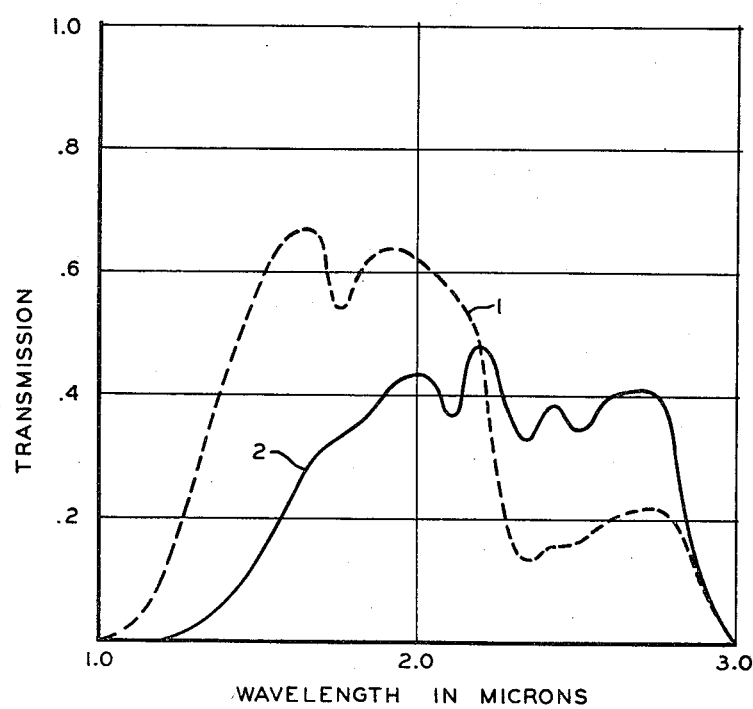

Additional objects and advantages will in part appear and in part be pointed out in the course of the following detailed description of several embodiments of the invention which are given as nonlimiting examples in connection with the accompanying drawings, in which:

Figure 1 is a sectional view illustrating diagrammatically one embodiment of the invention; and Fig. 2 is a graph illustrating the light-transmitting properties of several embodiments of the invention.

In accordance with the present invention, it has been found possible to produce a light-filtering material having more uniform characteristics, greater stability and a complete cutoff of all visible light with a relatively high transmission of invisible infrared radiations. Such a light-filtering material may be prepared by utilizing dehydration products of certain linear high polymers and, in particular, those containing a number of hydroxylic groups such as polyvinyl alcohol and substituted derivatives thereof, such as polyvinyl butyral or polyvinyl acetal, and other derivatives of polyvinyl alcohol, such as polyvinyl acetate, where complete substitution of the hydroxylic groups has taken place. In general, those dehydration products may be used which have a conjugated unsaturated system of the type $(-CH=CH-)_n$ where $n$ is substantially greater than one, and preferably in the neighborhood of twenty or more. Such dehydration products are preferably prepared by the dehydration of an organic linear hydroxyl-containing plastic material by treatment at elevated temperatures in the presence of an acid catalyst.

Referring now to Fig. 1, there is shown a signalling apparatus embodying a preferred form of the present invention. In this embodiment, there is provided a source 18 of light and heat radiations mounted in a housing 16 made of a material opaque to at least the visible portion of said radiations. This housing is open at one end and positioned therein is a filter F. Thus, any radiations emitted by the source 18, in order to escape from the housing, must pass through the filter F. The filter F preferably comprises a pair of protective sheets of "water white" glass 10. These glass sheets are preferably made as thin as is compatible with their requisite structural strength anad are of a low iron content. There is also provided a layer of filtering material 12 which, in its preferred form, comprises the dehydration products of an organic hydroxyl-containing plastic material capable of yielding on dehydration a conjugated unsaturated system of the type $(-CH=CH-)_n$, said layer of filtering material having such density as to absorb all visible radiations of wave length less than approximately 1 micron, while transmitting a relatively high percentage of radiations of a wave length greater than 1 micron. The manner in which such a filtering layer is produced will be described in more detail hereinafter.

In order to secure said filtering layer to the glass sheets, a suitable adhesive 14 is employed. Such an adhesive may be a partial polymer of butyl methacrylate. Another example of a typical suitable polymer is a polymer solution such as Acryloid F-10 produced by The Resinous Products and Chemical Company. Many other suitable adhesives will be apparent to those skilled in the art, but it is preferred that the adhesive be such that the lamination may be prepared using a minimum of pressure, since the films of filtering material involved are ordinarily quite brittle.

As a specific example of the preparation of one of the filtering materials of the present invention, a sheet of polyvinyl alcohol having a thickness of about .008" is imbibed in a 20% hydrochloric acid solution for approximately two minutes. The film is then dried and placed in an oven and baked for approximately 48 hours at 80° C. until it turns black. Hydrochloric acid is preferably used but other acids such as phosphoric acid and acidic-type compounds such as p-toluenesulfonic acid or sodium acid sulfate also may be used. Since these latter compounds are normally solids they are preferably incorporated in the sheet material by dissolving in a suitable solvent and mixing with the polyvinyl alcohol before it is cast or extruded into the sheet form. Most acids may be used, but some such as sulphuric acid are not desirable since they have too strong a dehydrating effect with the result that considerable charring would occur. It has been found that a sheet of polyvinyl alcohol treated in the above manner has the spectral characteristics as shown in curve 2 of Fig. 2. As can be seen from this curve, such a filtering material has a complete cutoff below 1.2 microns and has relatively high transmission between 1.4 microns and 3 microns. A layer of this polyvinyl alcohol which has been dehydrated in the above manner acts therefore, as an excellent filter for totally absorbing all visible radiation, while transmitting a relatively high percentage of infrared radiation.

In the above process, a preferred temperature range is that of approximately 60 to 80° C., since it is desired not to subject the polyvinyl alcohol to charring conditions. When an acid such as phosphoric is used, it has been found that at some time in the course of the heat treatment, between approximately 4 and 48 hours, the dehydration process reaches completion and further treatment has no further dehydrating effect. This is believed to be due to the gradual evaporation of the acid and/or it may possibly be due to the fact that those hydroxylic groups readily separated during dehydration are exhausted. In any event, it has been found that such a filter can be used for extended periods at temperatures of approximately 100° C. without deleterious effect upon the filter.

It has been found that a weak acid or an acid which will slowly volatilize is preferable to a strong acid such as sulphuric acid, which will not readily volatilize at the temperatures employed. Of course, wide variations in the temperatures, times, concentration of acid catalyst, and choice of acids employed are possible in the practice of the present invention. If a very strong acid is used, such as sulphuric acid, the dehydration time and heating temperature and time should be much shorter, and when dehydration has been accomplished, the acid should be neutralized by a weak alkali, such as sodium carbonate or bicarbonate.

It is not known exactly to what extent dehydration takes place. It is believed, however, that dehydration amounts to at least 10% and is probably 20% or more. It is also preferred in the above process to carry out the dehydration at such temperatures that substantially no decomposition of polyvinyl alcohol to carbon is accomplished.

The preferred polyvinyl alcohol, used in the form of a cast or extruded film, is RH391A polyvinyl alcohol supplied by the duPont Company although any partially or completely hydrolyzed polyvinyl acetate such as duPont RH611, RH491, RH403, RH489, etc., may be used. It is also possible to use a sheet of polyvinyl acetate such as "Gelva" produced by Shawinegan. In this case the phosphoric acid may be incorporated in an acetone solution of 1½ sec. visc. "Gelva" and cast to give a film of the desired thickness. Upon heating such a film to 150–200° C. for a period of approximately 5 minutes a filter of the desired characteristics is obtained. At elevated temperatures it is desirable to clamp the sheet while in the oven.

As another example of the preparation of a dehydration product for use as a layer of filter material, it has been found that polyvinyl butyral, such as Vinylite XYSG produced by the Bakelite Corporation, gives a very satisfactory filter. 20 grams of Vinylite XYSG are dissolved in 75 cc. of a solution containing 80 parts of a mixture of 3 parts ethyl acetate and 1 part methanol
20 parts methyl Cellosolve
1.5 parts phosphoric acid This mixture is cast in desired thicknesses preferably of .001" to .006". The sheet is then dried and placed in an oven for approximately 48 hours at a temperature of 80° C. Such a sheet, after the treatment outlined above has a spectral characteristic as shown by curve 1 of Figure 2. Curve 1 shows the characteristics of such a sheet .011 inch thick. To obtain such a thickness, several of the sheets are placed together and suitably laminated to each other and with the glass by an adhesive such as Acryloid F–10, or, as another example, partially polymerized butyl methacrylate which is subsequently baked to complete the polymerization. The same conditions of treatment apply to the polyvinyl butyral dehydration process as those described in connection with the dehydration of polyvinyl alcohol. In other words, it is desired to utilize temperatures which will prevent charring when the times employed are such as to accomplish a very substantial dehydration to give a conjugated unsaturated system. It is also preferred to utilize acids of the types mentioned in connection with the polyvinyl alcohol dehydration process. Further it is possible to imbibe into an acid-free cast film the desired acid from a suitable bath (alcohol-water) which will swell the film.

Since certain changes in the constructions set forth which embody the invention may be made without departing from its scope, it is intended that all matter contained in the above description, or shown in the accompanying drawings, shall be interpreted as illustrative and not in a limiting sense.

What is claimed is:

1. An optical filter substantially completely blocking all light in the visible spectrum and having high transmission in the near infrared and comprising a layer of at least one polymeric plastic from the class consisting of polyvinyl alcohol, polyvinyl acetate, polyvinyl acetal and polyvinyl butyral, said layer comprising dehydration products of said plastic having conjugated unsaturated systems of the type

where $n$ is substantially greater than one, said dehydration products being distributed throughout said layer and comprising at least 20% thereof, said layer being substantially free of charred material, the opacity of said layer to visible radiation deriving essentially from the presence therein of said dehydration products.

2. An optical filter such as is claimed in claim 1 wherein said layer consists of polyvinyl alcohol and dehydration products of polyvinyl alcohol.

3. An optical filter such as is claimed in claim 2 wherein the plastic material forming said layer is substantially completely dehydrated.

WILLIAM F. AMON, JR.
ELKAN R. BLOUT.

REFERENCES CITED

The following references are of record in the file of this patent:

UNITED STATES PATENTS

| Number | Name | Date |
| --- | --- | --- |
| 1,379,166 | Case | May 24, 1921 |
| 1,971,951 | Skirrow et al. | Aug. 28, 1934 |
| 2,199,992 | Hale | May 7, 1940 |
| 2,237,567 | Land | Apr. 8, 1941 |
| 2,306,108 | Land et al. | Dec. 22, 1942 |

OTHER REFERENCES

Hermann et al., "Polyvinyl alcohol," article in Berichte, German publication 1927, page 1660, copy of article (6 pages) and translation thereof in Div. 50.